(12) United States Patent
Olbert et al.

(10) Patent No.: US 12,521,690 B2
(45) Date of Patent: Jan. 13, 2026

(54) PHOSGENE PRODUCTION UNIT

(71) Applicant: BASF SE, Ludwigshafen am Rhein (DE)

(72) Inventors: Gerhard Olbert, Ludwigshafen am Rhein (DE); Stefan Engels, Ludwigshafen am Rhein (DE); Jan Pablo Josch, Ludwigshafen am Rhein (DE)

(73) Assignee: BASF SE, Ludwigshafen Am Rhein (DE)

( * ) Notice: Subject to any disclaimer, the term of this patent is extended or adjusted under 35 U.S.C. 154(b) by 529 days.

(21) Appl. No.: 18/017,678

(22) PCT Filed: Jul. 26, 2021

(86) PCT No.: PCT/EP2021/070822
§ 371 (c)(1),
(2) Date: Jan. 24, 2023

(87) PCT Pub. No.: WO2022/023246
PCT Pub. Date: Feb. 3, 2022

(65) Prior Publication Data
US 2023/0277999 A1    Sep. 7, 2023

(30) Foreign Application Priority Data
Jul. 27, 2020    (EP) .................................... 20187880

(51) Int. Cl.
*B01J 19/24*    (2006.01)
*C01B 32/80*    (2017.01)

(52) U.S. Cl.
CPC .............. *B01J 19/24* (2013.01); *C01B 32/80* (2017.08); *B01J 2219/00036* (2013.01)

(58) Field of Classification Search
CPC .............. B01J 19/24; B01J 2219/00036; B01J 2219/0002; C01B 32/80
(Continued)

(56) References Cited

U.S. PATENT DOCUMENTS 6,010,612 A * 1/2000 Freire ....................... C25B 9/23
205/438
2006/0252960 A1    11/2006 Sohn et al.
(Continued)

FOREIGN PATENT DOCUMENTS

| CN | 1729168 A | 2/2006 |
|---|---|---|
| CN | 101372464 A | 2/2009 |

(Continued)

OTHER PUBLICATIONS

International Search Report and Written Opinion received for PCT Patent Application No. PCT/EP2021/070822, mailed on Nov. 3, 2021, 9 pages.
"Phosgene and phosgenation process operations", National safety production education training teaching Editorial committee member meeting, 2013, pp. 71-72.

*Primary Examiner* — Huy Tram Nguyen
(74) *Attorney, Agent, or Firm* — Faegre Drinker Biddle & Reath LLP

(57) ABSTRACT

A unit for producing and processing phosgene, said unit being configured for at least one maintenance mode and at least one production mode and comprising a structure which defines a confined space in a production mode, said confined space being sub-divided into at least two sub-spaces, wherein (i) at least one sub-space contains at least one apparatus for producing phosgene; (ii) at least one sub-space, other than the at least one sub-space according to (i), contains at least one apparatus for processing phosgene; (iii) the structure comprises at least one openable and lockable (Continued)

access means for temporary access of at least one of the apparatuses according to (i) or (ii) from outside the structure in a maintenance mode.

15 Claims, 16 Drawing Sheets

(58) Field of Classification Search
USPC .......................................................... 422/600
See application file for complete search history.

(56) References Cited

U.S. PATENT DOCUMENTS

| | | | |
|---|---|---|---|
| 2009/0054684 A1 | 2/2009 | Stutz et al. | |
| 2017/0101367 A1 | 4/2017 | Knauf et al. | |
| 2020/0039925 A1 | 2/2020 | Hicks et al. | |

FOREIGN PATENT DOCUMENTS

| | | | | |
|---|---|---|---|---|
| CN | 104208984 A | 12/2014 | | |
| CN | 105822906 A | 8/2016 | | |
| CN | 206082551 U | 4/2017 | | |
| CN | 206538414 U | 10/2017 | | |
| CN | 109114349 A | 1/2019 | | |
| CN | 208525684 U | 2/2019 | | |
| CN | 208911759 U | 5/2019 | | |
| CN | 110790680 A | 2/2020 | | |
| CN | 210974827 U | 7/2020 | | |
| EP | 3122719 B1 | 5/2018 | | |
| TW | M547064 U | 8/2017 | | |
| WO | WO-2017194293 A1 | * | 11/2017 | ............. C01B 32/80 |
| WO | 2019/096925 A1 | 5/2019 | | |

* cited by examiner

18

18

PHOSGENE PRODUCTION UNIT

CROSS-REFERENCE TO RELATED APPLICATIONS

This application is a National stage application (under 35 U.S.C. § 371) of PCT/EP2021/070822, filed Jul. 26, 2021, which claims benefit of European Application No. 20187880.8, filed Jul. 27, 2020, both of which are incorporated herein by reference in their entirety.

The present invention relates to a unit for producing and processing phosgene being configured for at least one maintenance mode and at least one production mode and comprising a structure which defines a confined space in a production mode, to a production plant comprising such a unit, and to the use of such a unit in a production plant.

Phosgene is an important intermediate in the chemical industry. It is for example needed for producing isocyanates. In a commonly used process it is generated from carbon monoxide and chlorine in an exothermic reaction. Since phosgene is a highly toxic substance, safety measures must be taken that prevent phosgene from reaching the environment in case of a malfunction or leakage of an apparatus or a pipe containing phosgene.

In a known safety concept, a production unit for producing and processing phosgene comprises a structure which defines a confined space in a production mode. This confined space contains at least one apparatus for producing phosgene and at least one apparatus for processing phosgene. This means that the production and the processing of the phosgene takes place in the confined space inside the same structure such that the phosgene is confined in this structure during its "whole lifetime". Since of course it must be possible to get access to the apparatuses inside the structure, the structure must comprise at least one openable and lockable access means for temporary access of at least one of the apparatuses from outside the structure in a maintenance mode. In case of a leakage the production and processing of the phosgene must be stopped completely, all apparatuses in the confined space must be flushed from phosgene and the whole confined space must be evacuated from phosgene before the access means is opened. In a regular maintenance case, all apparatuses in the confined space must be flushed from phosgene before the access means is opened. So, the amount of phosgene that needs to be taken care of is relatively large, even if only a single apparatus is affected by the leakage or needs maintenance.

It is therefore an object of the invention to provide an improved unit for producing and processing phosgene that allows a more efficient handling in case of a leakage or in the case of maintenance.

According to the invention, the confined space is sub-divided into at least two sub-spaces, one containing at least one apparatus for producing phosgene and one containing at least one apparatus for processing phosgene. This makes it possible to evacuate only one sub-space and/or the apparatus or apparatuses being contained in this sub-space from phosgene whereas the apparatus/apparatuses being contained in the other sub-space do not need to be emptied from phosgene. This reduces the amount of phosgene that needs to be removed from the unit in the case of a leakage as well as in the case of maintenance work. In order to be able to conduct maintenance work, the structure must comprise at least one openable and lockable access means for temporary access of at least one of the apparatuses in a maintenance mode.

Therefore, the present invention relates to a unit for producing and processing phosgene, which is configured for at least one maintenance mode and at least one production mode and which comprises a structure which defines a confined space in a production mode, said confined space being sub-divided into at least two sub-spaces, wherein
 (i) at least one sub-space contains at least one apparatus for producing phosgene;
 (ii) at least one sub-space, other than the at least one sub-space according to (i), contains at least one apparatus for processing phosgene;
 (iii) the structure comprises at least one openable and lockable access means for temporary access of at least one of the apparatuses according to (i) or (ii) from outside the structure in a maintenance mode.

Preferably, the unit exhibits at least one maintenance mode in which at least one of the access means according to (iii) is opened and provides access to an apparatus for producing phosgene comprised in at least one of the sub-spaces according to (i) from outside the structure and in which at least one sub-space according to (ii) is in confined state. In this maintenance mode the apparatus for producing phosgene can be maintained while the apparatus for processing phosgene can remain in a state in which it contains phosgene. So, the amount of phosgene to be removed from the unit is reduced.

Alternatively or additionally, the unit exhibits at least one maintenance mode in which at least one of the access means according to (iii) is opened and provides access to an apparatus for processing phosgene comprised in a sub-space according to (ii) and in which at least one sub-space according to (i) is in confined state. In this maintenance mode the apparatus for processing phosgene can be maintained while the apparatus for producing phosgene can remain in a state in which it contains phosgene. So, the amount of phosgene to be removed from the unit is reduced.

In some cases it might be necessary to perform maintenance work on both, the at least one apparatus for producing phosgene according to (i) as well as on the apparatus for processing phosgene according to (ii). It is therefore preferred that the unit exhibits at least one maintenance mode in which at least one of the access means according to (iii) is opened and provides access to an apparatus for producing phosgene comprised in a sub-spaces according to (i) and to an apparatus for processing phosgene comprised in a sub-spaces according to (ii).

Commonly, the unit comprises a phosgene line connecting an apparatus for producing phosgene according to (i) and an apparatus for processing phosgene according to (ii) so that the apparatuses are in fluid communication with each other.

In order to prevent that phosgene from a leakage in the phosgene line reaches the environment, it is preferred that this phosgene line is located completely inside the confined space.

In order to provide the possibility to disjoin the phosgene flow between the apparatus for producing phosgene and the apparatus for processing phosgene, it is preferred that the phosgene line comprises at least one closing valve, wherein it is even more preferred that the phosgene line comprises a first closing valve for an apparatus for producing phosgene according to (i) and a second closing valve, other than the first closing valve, for an apparatus for processing phosgene according to (ii).

Additional benefits can be achieved if the phosgene line comprises at least one branch point thus forming a phosgene net to which at least two apparatuses for producing phosgene according to (i) and at least one apparatus for processing phosgene according to (ii), or at least one apparatus for producing phosgene according to (i) and at least two apparatuses for processing phosgene according to (ii) are connected, especially if all apparatuses for producing phosgene according to (i), comprised in the unit, and all apparatuses for processing phosgene according to (ii), comprised in the unit, are connected to the phosgene net. With such a phosgene net it is in many cases possible to continue with the production—possibly with reduced capacity—while at least one apparatus is out of use and possibly maintained, especially if the confined space comprises at least two sub-spaces according to (i) and/or at least two sub-spaces according to (ii).

In order to make full use of the possibilities of a phosgene-net, it is preferred that it comprises a closing valve for each sub-space according to (i) and a closing valve for each sub-space according to (ii).

Generally, the unit comprises a flushing device for flushing phosgene out of at least one of the apparatuses according to (i) or (ii), which is preferably designed to additionally flush phosgene out of at least a part of the phosgene line, or—if present—out of at least part of the phosgene net.

Since it is one of the advantages of the unit according to the invention that the unit can partially be emptied from phosgene, the flushing device preferably comprises a first flushing sub-device for an apparatus for producing phosgene according to (i) and a second flushing sub-device, other than the first flushing sub-device, for an apparatus for processing phosgene according to (ii), especially a sub-device for each sub-space according to (i) and (ii).

Generally, the unit comprises an exhaust device with a suction end, said suction end being located inside the confined space. Such an exhaust device is often used in order to create a slight under-pressure inside the confined space and to free the confined space from phosgene in case of a leakage.

Since it will often be sufficient to evacuate only one sub-space from phosgene, it is preferred that the exhaust device comprises a first suction end inside a sub-space according to (i) and a second suction end, other than the first suction end, inside a sub-space according to (ii). In this case, the exhaust device is designed to exhaust a sub-space according to (i) and a sub-space according to (ii) independently from one another.

The advantages of the inventive unit can be fully used if the exhaust device comprises a suction end in each sub-space according to (i) and (ii).

Generally, the unit comprises a carbon monoxide (CO) supply line and a chlorine ($Cl_2$) supply line for supply of the apparatus for producing phosgene according to (i) with CO and $Cl_2$.

Since the reaction of CO and $Cl_2$ to phosgene is exothermic, the unit usually comprises a cooling liquid supply line and a cooling liquid return line for cooling the apparatus for producing phosgene according to (i) with the cooling liquid.

It can be preferred that at least one of the sub-spaces according to (i) or (ii) contains a phosgene buffer apparatus. This can help to continue with the production, even if an apparatus for producing phosgene according to (i) is not working, for example because of maintenance work.

Of course, the inventive concept is not limited to a unit comprising only two sub-spaces according to (i), it can comprise at least two sub-spaces according to (i), preferably from two to six sub-spaces according to (i), more preferably from two to four sub-spaces according to (i).

In the same way, the inventive concept is not limited to a unit comprising only two sub-spaces according to (ii), it can comprise at least two sub-spaces according to (ii), preferably from two to six sub-spaces according to (ii), more preferably from two to four sub-spaces according to (ii).

Providing more than one sub-space according to (i) and/or more than one sub-space according to (ii) enhances the flexibility of the unit, especially if the phosgene line is in form of a phosgene net.

First Type of Inventive Unit in which the Structure Comprises a Joint Outer Housing in which at Least Two Sub-Spaces are Located In a first type of the inventive unit, the structure comprises a joint outer housing in which at least one sub-space according to (i) and at least one sub-space according to (ii) are located. Adjacent sub-spaces are separated from each other by an inner separation means.

In some cases it can be useful if a maintenance person can move directly from one sub-space directly to an adjacent sub-space without the need of leaving the structure. Therefore it can be preferred that the inner separation means comprises at least one inner openable and lockable access means for temporary access of at least one sub-space from at least one other sub-space.

Often, the inner separation means will be in form of or comprise at least one inner wall.

As has been mentioned above, it can be useful if a sub-space is accessible from an adjacent sub-space. So, it can be preferred that the inner wall comprises an opening, and the unit further comprises at least one closing element for said opening, wherein said opening and said at least one closing element together form the inner openable and lockable access means. The opening must be large enough to allow a person to pass through it, so it should have a cross-section of at least $0.5$ $m^2$. Preferably the opening has a cross-section of at least $1$ $m^2$. Often, it will be useful to provide larger openings, especially openings with a cross-section in the range of from $2$ to $10$ $m^2$, preferably in the range of from $3$ to $8$ $m^2$, more preferably in the range of from $4$ to $6$ $m^2$, more preferably in the range of from $4.5$ to $5.5$ $m^2$ such as about $5$ $m^2$.

This at least one closing element can for example be or comprise a pivoting door, a sliding door, or a panel, wherein said panel is designed to be at least partially, preferably completely, removable from the inner wall.

If the unit having a joint outer wall is designed for one special use, it can be preferred that the at least one inner wall is permanently connected to the joint outer housing, because then the at least one inner wall can for example be penetrated by lines—for example a phosgene line—and can be used to attach all sorts of things like cables, lights, etc. in a permanent manner.

In contrast, if it is desired to use the unit more flexibly, it can be preferred that the at least one inner wall is removably but gas-tightly connected to the joint outer housing. So, the confined space can individually be separated into the at least two sub-spaces.

In one geometrical set-up, at least one sub-space is located laterally to at least one other sub-space, in another geometrical set-up, at least one sub-space is located on top of at least one other sub-space.

As has already been mentioned, it is often preferred that the sub-space according to (i) and the sub-space according to (ii) can be accessed independently from the outside when the unit is in a maintenance mode, such that the sub-space and the apparatus located in the sub-space that do not need to be accessed, do not need to be freed from phosgene. So, it is often preferred that the joint outer housing comprises (iv) at least one openable and lockable access means for temporary access of at least one sub-space according to (i); and (v) at least one openable and lockable access means, other than the at least one outer openable and lockable access means according to (iv), for temporary access of at least one sub-space according to (ii).

In other cases it can be sufficient that only one sub-space is directly accessible from the outside, for example because an inner openable and lockable access means is provided. In this case it can be preferred to provide (iv) at least one openable and lockable access means for temporary access of at least one sub-space according to (i); or (v) at least one openable and lockable access means for temporary access of at least one sub-space according to (ii).

This can be a preferred set-up if the apparatus being accessible via the openable and lockable access means according to (iii) needs maintenance more frequently than the other apparatus.

Often, it is very difficult for the maintenance persons to work inside the structure, for example because the space is very limited. So, it can be preferred that at least one of the openable and lockable access means according to (iv) or (v) is configured as an openable and lockable transfer means for temporary removal, in a maintenance mode, of at least part of at least one apparatus for producing phosgene according to (i) or at least part of at least one apparatus for processing phosgene according to (ii) from the structure through at least one of said transfer means in opened state. This means that at least one apparatus or a part of the same can be partially or completely be removed out of the structure so that it can be maintained more easily.

Usually, the at least one outer openable and lockable access means comprises an opening in the joint outer housing and at least one closing means for closing said opening. This at least one closing element can for example comprise, or preferably be, a pivoting door, a sliding door, or a panel, wherein said panel is designed to be at least partially, preferably completely, removable. The opening must be large enough to allow a person to pass through it, so it should have a cross-section of at least 0.5 m$^2$. Preferably the opening has a cross-section of at least 1 m$^2$. Often, it will be useful to provide larger openings, especially openings with a cross-section in the range of from 2 to 10 m$^2$, preferably in the range of from 3 to 8 m$^2$, more preferably in the range of from 4 to 6 m$^2$, more preferably in the range of from 4.5 to 5.5 m$^2$ such as about 5 m$^2$.

The opening of an openable and lockable transfer means must be large enough to allow an apparatus according to (i) or an apparatus according to (ii), or a part of such an apparatus to pass through it, so it should have a sufficiently large cross-section that is usually larger than a cross-section of an openable and lockable access means according to (iii). Preferably the opening of an openable and lockable transfer means has a cross-section in the range of from 1 to 50 m$^2$, more preferably in the range of from 2 to 40 m$^2$, more preferably in the range of from 5 to 30 m$^2$, more preferably in the range of from 10 to 25 m$^2$. Especially in the case when the opening of an openable and lockable transfer means has a cross section of at least 10 m$^2$, in particular more than 10 m$^2$, it can be useful to use more than one panel for closing this opening.

In order to get easy access to many different places inside the confined space, at least a part of the joint outer housing can be in form of a skeleton to which a plurality of removable panels, said removable panels forming the at least one closing element, are removably attached.

For some applications it can be useful if the structure further comprises at least one air-lock chamber outside the joint outer housing. In this case the flushing of the apparatus being located in the sub-chamber to be accessed can be avoided if the maintenance person wears a full protective suit. This can be time-saving in cases in which only minor maintenance work or only checks need to be performed.

The joint outer housing can house, additionally to the sub-space according to (i) and (ii), at least one supply sub-space in which at least a part of the phosgene line is located. This can be advantageous especially in the case that the phosgene line is a phosgene net, and/or in the case that the unit comprises at least one removable inner wall. If such a supply sub-space is present, it is preferably located under or over the sub-spaces according to (i) and (ii). In some cases it might also be located laterally from the sub-chambers according to (i) and (ii).

If the joint housing houses such a supply sub-space, the unit commonly comprises at least one intermediate separating means which separates the at least one supply sub-space from the sub-spaces according to (i) and (ii). This intermediate separating means is usually at least one intermediate ceiling, and/or at least one intermediate side wall, and/or at least one intermediate floor.

Commonly, the joint outer housing is located on a base. The joint outer housing can have an own floor, then the base does not constitute a part of the structure. But it is also possible that the housing lacks an own floor. In this case the base constitutes a part of the structure.

Second Type of the Inventive Unit in which the Structure Comprises at Least Two Outer Housings Since according to the invention, the confined space is divided into at least two sub-spaces, the two sub-spaces do not need to be enclosed by a joint outer housing. So, according to a second type of the inventive unit, at least two outer housings are provided, such that the structure comprises:

(vi) at least one outer housing in which at least one sub-space according to (i) is located, and (vii) at least one outer housing, other than the outer housing according to (vi), in which at least one sub-space according to (ii) is located.

Of course, also in the case of the second type of the inventive unit, at least one sub-space should be accessible in a maintenance mode. In order to achieve this, at least one of the at least one outer housings according to (vi) and (vii) can comprise at least one opening, and the unit further comprises at least one closing element for closing said opening.

As has already been described above, the at least one opening can be configured for temporary removal, in a maintenance mode, of at least part of at least one apparatus for producing phosgene according to (i) or at least part of at least one apparatus for processing phosgene according to (ii) from the structure through said opening in order to ease the maintenance process. Also here, the at least one closing element can comprise or be, a pivoting door, a sliding door, or a panel, wherein said panel is designed to be at least partially, preferably completely, removable.

It is possible to locate at least one outer housing on top of at least one other outer housing. In this case it is possible that the upper housing lacks a floor and is designed to be liftable from the at least one lower housing, such that the apparatus located in the sub-space housed by the upper housing in the production mode can be completely freed from its housing, so that it is very easily accessible in the maintenance mode. In this case, the upper outer housing forms the openable and lockable access means.

Alternatively, at least one of the outer housing according to (vi) and at least one of the outer housing according to (vii) are located on a joint base. In this case it is preferred that at least a part of the phosgene line is located inside the joint base, wherein this part of the joint base constitutes part of the structure.

As has been described above, at least one of the outer housings according to (vi) and/or at least one of the outer housings according to (vii) can lack a floor and can be designed to be removable, preferably liftable, from the joint base for easy access of the apparatus in the maintenance mode.

It is possible that at least one of the outer housings according to (vi) or at least one of the outer housings according to (vii) constitutes a joint outer housing enclosing at least two sub-spaces. In this case the first type of the unit and the second type of the unit are "mixed".

Since the structure of the unit will geometrically most often be a cuboid or will be composed of cuboids, an opening in the structure will mostly be located essentially in a vertical plane or in the horizontal plane. This applies to the first as well as to the second type.

According to the present invention, the unit for producing and processing phosgene particularly comprises according to (i) at least one apparatus for producing phosgene contained in at least one sub-space and according to (ii) at least one apparatus for processing phosgene contained in at least one sub-space, other than the at least one sub-space according to (i). Further, said unit is particularly configured for at least one maintenance mode and at least one production mode. In the context of the present invention, an apparatus for producing phosgene can be in production mode or in maintenance mode, wherein during the production mode production of phosgene is in progress, and wherein during maintenance mode no production of phosgene is in progress. Thus, it is preferred in the context of the present invention, that each apparatus for producing phosgene is in production mode or in maintenance mode, wherein during the production mode production of phosgene is in progress, and wherein during maintenance mode no production of phosgene is in progress. Similarly, an apparatus for processing phosgene can be in production mode or in maintenance mode, wherein during the production mode processing of phosgene is in progress, and wherein during maintenance mode no processing of phosgene is in progress. Thus, it is preferred in the context of the present invention, that each apparatus for processing phosgene is in production mode or in maintenance mode, wherein during the production mode processing of phosgene is in progress, and wherein during maintenance mode no processing of phosgene is in progress.

Usually, the unit according to the invention will be comprised in a production plant, preferably in a production plant for producing an isocyanate, more preferably for producing a diisocyanate, more preferably for producing a toluene diisocyanate, more preferably for producing one or more of 2,4-toluene diisocyanate (TDI) and 2,6-toluene diisocyanate. If a mixture comprising 2,4-toluene diisocyanate and 2,6-toluene diisocyanate is produced, the molar ratio of 2,4-toluene diisocyanate relative to 2,6-toluene diisocyanate is preferably in the range of from 1:1 to 6:1, more preferably in the range of from 1:1 to 5:1, such as in the range of from 1:1 to 2:1 like 1.5:1, or such as in the range of from 3.5:1 to 4.5:1 like 4:1. Further, it is conceivable that said diisocyanate comprises or is methylene diphenylisocyanate (MDI) and/or hexamethylene diisocyanate (HDI).

The present invention is further illustrated by the following set of embodiments and combinations of embodiments resulting from the dependencies and back-references as indicated. In particular, it is noted that in each instance where a range of embodiments is mentioned, for example in the context of a term such as "The unit of any one of embodiments (1) to (4)", every embodiment in this range is meant to be explicitly disclosed for the skilled person, i.e. the wording of this term is to be understood by the skilled person as being synonymous to "The unit of any one of embodiments (1), (2), (3), and (4)". Further, it is explicitly noted that the following set of embodiments represents a suitably structured part of the general description directed to preferred aspects of the present invention, and, thus, suitably supports, but does not represent the claims of the present invention.

1. A unit for producing and processing phosgene, said unit being configured for at least one maintenance mode and at least one production mode and comprising a structure which defines a confined space in a production mode, said confined space being sub-divided into at least two sub-spaces, wherein
   (i) at least one sub-space contains at least one apparatus for producing phosgene;
   (ii) at least one sub-space, other than the at least one sub-space according to (i), contains at least one apparatus for processing phosgene;
   (iii) the structure comprises at least one openable and lockable access means for temporary access of at least one of the apparatuses according to (i) or (ii) from outside the structure in a maintenance mode.

2. The unit of embodiment 1, exhibiting at least one maintenance mode in which at least one of the access means according to (iii) is opened and provides access to an apparatus for producing phosgene comprised in at least one of the sub-spaces according to (i) from outside the structure and in which at least one sub-space according to (ii) is in confined state.

3. The unit of embodiment 1, exhibiting at least one maintenance mode in which at least one of the access means according to (iii) is opened and provides access to an apparatus for processing phosgene comprised in a sub-space according to (ii) and in which at least one sub-space according to (i) is in confined state.

4. The unit of embodiment 1, exhibiting at least one maintenance mode in which at least one of the access means according to (iii) is opened and provides access to an apparatus for producing phosgene comprised in a sub-spaces according to (i) and to an apparatus for processing phosgene comprised in a sub-spaces according to (ii).

5. The unit of any one of embodiments 1 to 4, comprising a phosgene line connecting an apparatus for producing phosgene according to (i) and an apparatus for processing phosgene according to (ii) so that the apparatuses are in fluid communication with each other.

6. The unit of embodiment 5, wherein the phosgene line is located completely inside the confined space.

7. The unit of embodiment 5 or 6, wherein the phosgene line comprises at least one closing valve.

8. The unit of embodiment 7, wherein the phosgene line comprises a first closing valve for an apparatus for producing phosgene according to (i) and a second closing valve, other than the first closing valve, for an apparatus for processing phosgene according to (ii)

9. The unit of any one of embodiments 5 to 8, wherein the phosgene line comprises at least one branch point thus forming a phosgene net to which at least two apparatuses for producing phosgene according to (i) and at least one apparatus for processing phosgene according to (ii), or at least one apparatus for producing phosgene according to (i) and at least two apparatuses for processing phosgene according to (ii) are connected.

10. The unit of embodiment 9, wherein all apparatuses for producing phosgene according to (i), comprised in the unit, and all apparatuses for processing phosgene according to (ii), comprised in the unit, are connected to the phosgene net.

11. The unit of embodiment 9 or 10, wherein the phosgene net comprises a closing valve for each sub-space according to (i) and a closing valve for each sub-space according to (ii).

12. The unit of any one of embodiments 1 to 11, comprising a flushing device for flushing phosgene out of at least one of the apparatuses according to (i) or (ii).

13. The unit of embodiment 12, wherein said flushing device is designed to additionally flush phosgene out of at least part of the phosgene line, as defined in any one of embodiments 5 to 8, or out of at least part of the phosgene net, as defined in any one of embodiments 9 to 11.

14. The unit of embodiment 13, wherein said flushing device comprises a first flushing sub-device for an apparatus for producing phosgene according to (i) and a second flushing sub-device, other than the first flushing sub-device, for an apparatus for processing phosgene according to (ii).

15. The unit of embodiment 13 or 14, wherein the flushing device comprises a sub-device for each sub-space according to (i) and (ii).

16. The unit of any one of embodiments 1 to 15, comprising an exhaust device with a suction end, said suction end being located inside the confined space.

17. The unit of embodiment 16, wherein the exhaust device comprises a first suction end inside a sub-space according to (i) and a second suction end, other than the first suction end, inside a sub-space according to (ii).

18. The unit of embodiment 17, wherein the exhaust device is designed to exhaust a sub-space according to (i) and a sub-space according to (ii) independently from one another.

19. The unit of one of embodiments 16 to 18, wherein the exhaust device comprises a suction end in each sub-space according to (i) and (ii).

20. The unit of any one of embodiments 1 to 19, comprising a carbon monoxide (CO) supply line and a chlorine ($Cl_2$) supply line for supply of the apparatus for producing phosgene according to (i) with CO and $Cl_2$.

21. The unit of any one of embodiments 1 to 20, comprising a cooling liquid supply line and a cooling liquid return line for cooling the apparatus for producing phosgene according to (i) with the cooling liquid.

22. The unit of any one of embodiments 1 to 21, wherein at least one of the sub-spaces according to (i) or (ii) contains a phosgene buffer apparatus.

23. The unit of any one of embodiments 1 to 22, comprising at least two sub-spaces according to (i), preferably from two to six sub-spaces according to (i), more preferably from two to four sub-spaces according to (i).

24. The unit of any one of embodiments 1 to 23, comprising at least two sub-spaces according to (ii), preferably from two to six sub-spaces according to (ii), more preferably from two to four sub-spaces according to (ii).

25. The unit of one of the embodiments 1 to 24, wherein the structure comprises a joint outer housing in which at least one sub-space according to (i) and at least one sub-space according to (ii) are located.

26. The unit of embodiment 25, wherein adjacent sub-spaces are separated from each other by an inner separation means.

27. The unit of embodiment 26, wherein the inner separation means comprises at least one inner openable and lockable access means for temporary access of at least one sub-space from at least one other sub-space.

28. The unit of any one of embodiments 26 or 27, wherein the inner separation means comprises at least one inner wall.

29. The unit of embodiment 28, wherein the at least one inner wall comprises an opening, the unit further comprising at least one closing element for said opening, said opening and said at least one closing element together forming the inner openable and lockable access means.

30. The unit of embodiment 29, wherein the at least one closing element comprises, preferably is, a pivoting door, a sliding door, or a panel, wherein said panel is designed to be at least partially, preferably completely, removable from the inner wall.

31. The unit of any one of embodiments 28 to 30, wherein the at least one inner wall is permanently connected to the joint outer housing.

32. The unit of one any one of embodiments 28 to 31, wherein the at least one inner wall is removably connected to the joint outer housing.

33. The unit of any one of embodiments 25 to 32, wherein at least one sub-space is located laterally to at least one other sub-space.

34. The unit of one of embodiments 25 to 33, wherein at least one sub-space is located on top of at least one other sub-space.

35. The unit of any one of embodiments 25 to 34, wherein the joint outer housing comprises
    (iv) at least one openable and lockable access means for temporary access of at least one sub-space according to (i); or
    (v) at least one openable and lockable access means for temporary access of at least one sub-space according to (ii).

36. The unit of any one of embodiments 25 to 34, wherein the joint outer housing comprises
    (iv) at least one openable and lockable access means for temporary access of at least one sub-space according to (i); and
    (v) at least one openable and lockable access means, other than the at least one outer openable and lockable access means according to (iv), for temporary access of at least one sub-space according to (ii).

37. The unit of embodiment 35 or 36, wherein at least one of the openable and lockable access means according to (iv) or (v) is configured as an openable and lockable transfer means for temporary removal, in a maintenance mode, of at least part of at least one apparatus for producing phosgene according to (i) or at least part of at least one apparatus for processing phosgene according to (ii) from the structure through at least one of said transfer means in opened state.

38. The unit of any one of embodiments 35 to 37, wherein the at least one outer openable and lockable access means comprises an opening in the joint outer housing and at least one closing means for closing said opening.
39. The unit of embodiment 38, wherein the at least one closing element comprises, preferably is, a pivoting door, a sliding door, or a panel, wherein said panel is designed to be at least partially, preferably completely, removable.
40. The unit of embodiment 39, wherein at least part of the joint outer housing is in form of a skeleton to which a plurality of removable panels, said removable panels forming the at least one closing element, are removably attached.
41. The unit of any one of embodiments 25 to 40, wherein the structure further comprises at least one air-lock chamber outside the joint outer housing.
42. The unit of any one of embodiments 25 to 41, wherein the structure comprises a joint outer housing in which at least one sub-space according to (i) and at least one sub-space according to (ii) and, additionally, at least one supply sub-space are located, wherein in said supply sub-space, at least part of the phosgene line, as defined in any one of embodiments 5 to 8, or at least part of the phosgene net, as defined in any one of embodiments 9 to 11, is located.
43. The unit of embodiment 42, further comprising at least one intermediate separating means which separate the at least one supply sub-space from the sub-spaces according to (i) and (ii), wherein said at least one intermediate separating means is one or more of at least one intermediate ceiling, at least one intermediate side wall, and at least one intermediate floor.
44. The unit of any one of embodiments 25 to 43, wherein the joint outer housing is located on a base.
45. The unit of embodiment 44, wherein the joint outer housing lacks a floor and at least part of the base constitutes part of the structure.
46. The unit of any one of embodiments 25 to 44, wherein the joint outer housing comprises a floor.
47. The unit of any one of embodiments 1 to 46, wherein the structure comprises
   (vi) at least one outer housing in which at least one sub-space according to (i) is located, and
   (vii) at least one outer housing, other than the outer housing according to (vi), in which at least one sub-space according to (ii) is located.
48. The unit of embodiment 47, wherein at least one of the at least one outer housing according to (vi) and (vii) comprises at least one opening, said unit further comprising at least one closing element for closing said opening.
49. The unit of embodiment 48, wherein the at least one opening is configured for temporary removal, in a maintenance mode, of at least part of at least one apparatus for producing phosgene according to (i) or at least part of at least one apparatus for processing phosgene according to (ii) from the structure through said opening.
50. The unit of embodiment 48 or 49, wherein the at least one closing element comprises, preferably is, a pivoting door, a sliding door, or a panel, wherein said panel is designed to be at least partially, preferably completely, removable.
51. The unit of any one of embodiments 47 to 49, wherein at least one outer housing is located on top of at least one other outer housing.
52. The unit of embodiment 51, wherein the at least one outer housing being located on top of at least one other outer housing lacks a floor and is designed to be liftable from the at least one outer housing.
53. The unit of any one of embodiments 47 to 50, wherein at least one of the outer housing according to (vi) and at least one of the outer housing according to (vii) are located on a joint base.
54. The unit of embodiment 53 as far as embodiment is directly or indirectly dependent on embodiments 5, wherein at least part of the phosgene line is located inside the joint base, wherein this part of the joint base constitutes part of the structure.
55. The unit of embodiment 53 or 54, wherein at least one of the outer housings according to (vi) and/or at least one of the outer housings according to (vii) lacks a floor and is designed to be removable, preferably liftable, from the joint base.
56. The unit of any one of embodiments 47 to 55, wherein at least one of the outer housings according to (vi) or at least one of the outer housings according to (vii) constitutes a joint outer housing as defined in any one of embodiments 24 to 45.
57. The unit of any one of embodiments 1 to 56, comprising at least one opening as defined in any of embodiments 29, 38, 48 and 49, wherein at least one opening is located essentially in a vertical plane.
58. The unit of any one of embodiments 1 to 57, comprising at least one opening as defined in any of embodiments 29, 38, 38 and 49, wherein at least one opening is located essentially in a horizontal plane.
59. The unit of any one of embodiments 1 to 58, wherein each apparatus for producing phosgene is in production mode or in maintenance mode, wherein during the production mode production of phosgene is in progress, and wherein during maintenance mode no production of phosgene is in progress.
60. The unit of any one of embodiments 1 to 59, wherein each apparatus for processing phosgene is in production mode or in maintenance mode, wherein during the production mode processing of phosgene is in progress, and wherein during maintenance mode no processing of phosgene is in progress.
61. The unit of any one of embodiments 1 to 60, being comprised in a production plant, preferably in a production plant for producing an isocyanate, more preferably in a production plant for producing a diisocyanate, more preferably in a production plant for producing a toluene diisocyanate, more preferably in a production plant for producing one or more of toluene-2,4-diisocyanate and toluene-2,6-diisocyanate.
62. A production plant, preferably a production plant for producing an isocyanate, more preferably a production plant for producing a diisocyanate, more preferably a production plant for producing a toluene diisocyanate, more preferably a production plant for producing one or more of toluene-2,4-diisocyanate and toluene-2,6-diisocyanate, said production plant comprising a unit according to any one of embodiments 1 to 60.
63. Use of a unit according to any one of embodiments 1 to 60 in a production plant, preferably in a production plant for producing an isocyanate, more preferably in a production plant for producing a diisocyanate, more preferably in a production plant for producing a toluene diisocyanate, more preferably in a production plant for producing one or more of toluene-2,4-diisocyanate and toluene-2,6-diisocyanate.

BRIEF DESCRIPTION OF THE FIGURES

The invention will now be further described by means of example embodiments in view of the figures. The figures show:

FIGS. 1 and 2 show a first example embodiment of a first type of an inventive unit. The unit comprises a structure which encloses a confined space when the unit is in a production mode. In this example embodiment the structure comprises a joint outer housing 10, a base onto which the joint outer housing is placed in a gas-tight manner and two outer doors or outer removable panels 12 which close openings of the joint outer housing 10 when the unit is in its production mode. It is to be noted that the base could also form a part of the joint outer housing 10. The outer doors/outer removable panels 12 and the openings closed by them in the production mode constitute openable and lockable access means.

Figure 1:
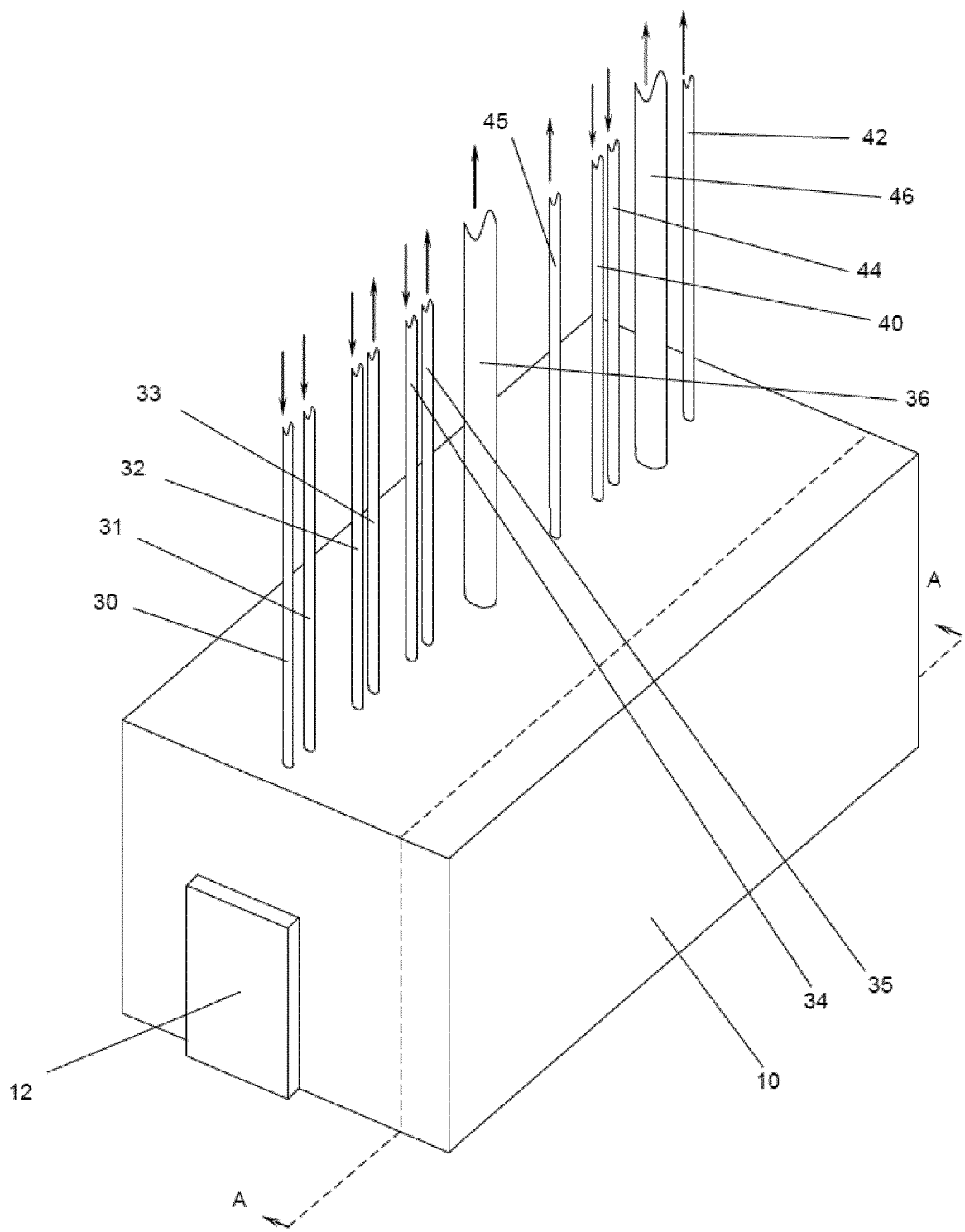
FIG. 1 a first example embodiment of a first type of the invention in a schematic perspective representation.

The confined space is divided into a sub-space according to (i) P and a sub-space according to (ii) S by means of a permanent inner wall 14. The two sub-spaces P, S can independently be accessed via the openings—which are closed by the outer doors/panels 12 in the production mode—when the unit is in a maintenance mode.

An apparatus for producing phosgene 60 is located in the sub-space according to (i) P and is supplied with carbon monoxide by means of a carbon monoxide supply line 30 and with chlorine by means of a chlorine supply line 31. In order to remove heat from the apparatus for producing phosgene 60, a cooling liquid supply line 32 and a cooling liquid return line 33 are provided. The produced phosgene leaves the apparatus for producing phosgene 60 via a phosgene line 50 which ends at an apparatus for processing phosgene 62. This apparatus for processing phosgene 62 is located in the sub-space according to (ii), so the phosgene line 50 extends from the sub-space according to (i) to the sub-space according to (ii). In the example embodiment shown, the phosgene line 50 extends through the permanent inner wall 14. Closing valves are provided on both sides of the permanent inner wall 14.

Additionally to the phosgene line 50 a reagent supply line 40 extends to the apparatus for processing phosgene 62 and a product or product mixture in solvent output line 42 extends from the apparatus for processing phosgene 62. So, the phosgene produced inside the confined space is also processed inside the confined space.

In case of a leakage, phosgene could come into the sub-space according to (i) P or into the sub-space according to (ii) S outside the apparatuses 60, 62 and the phosgene line 50. In order to be able to remove this phosgene, a first exhaust line 46 for the sub-space according to (i) P and a second exhaust line 46 for the sub-space according to (ii) S are provided, such that the sub-spaces can be evacuated from phosgene independently from each another.

Before the sub-space according to (i) P is opened, the apparatus for producing phosgene 60 and the section of the phosgene line 50 being located in the sub-space according to (i) P must be phosgene-free. For this purpose, a first flushing medium supply line 44 and a first flushing medium return line 45 are provided. In the same manner a second flushing medium supply line 44 and a second flushing medium return line 45 are provided for the apparatus for processing phosgene 62 and the section of the phosgene line 50 located in the subspace according to (ii) S. So it is not necessary to flush the apparatus for processing phosgene 62 when the sub-space according to (i) is opened for maintenance purposes and vice versa.

Figure 2:
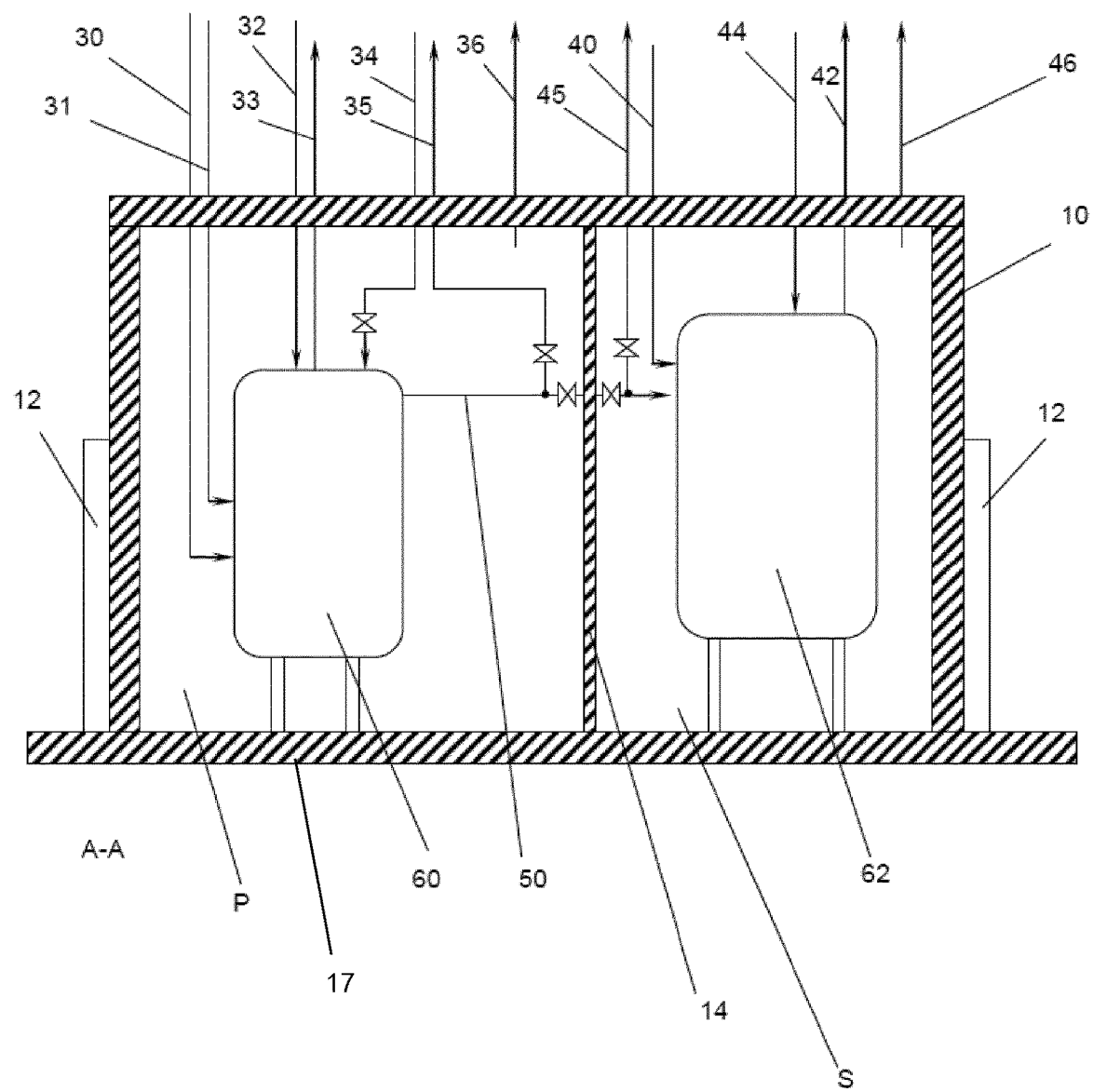
FIG. 2 the example embodiment of FIG. 1 in a sectional view taken along plane A-A in FIG. 1.
Figure 3:
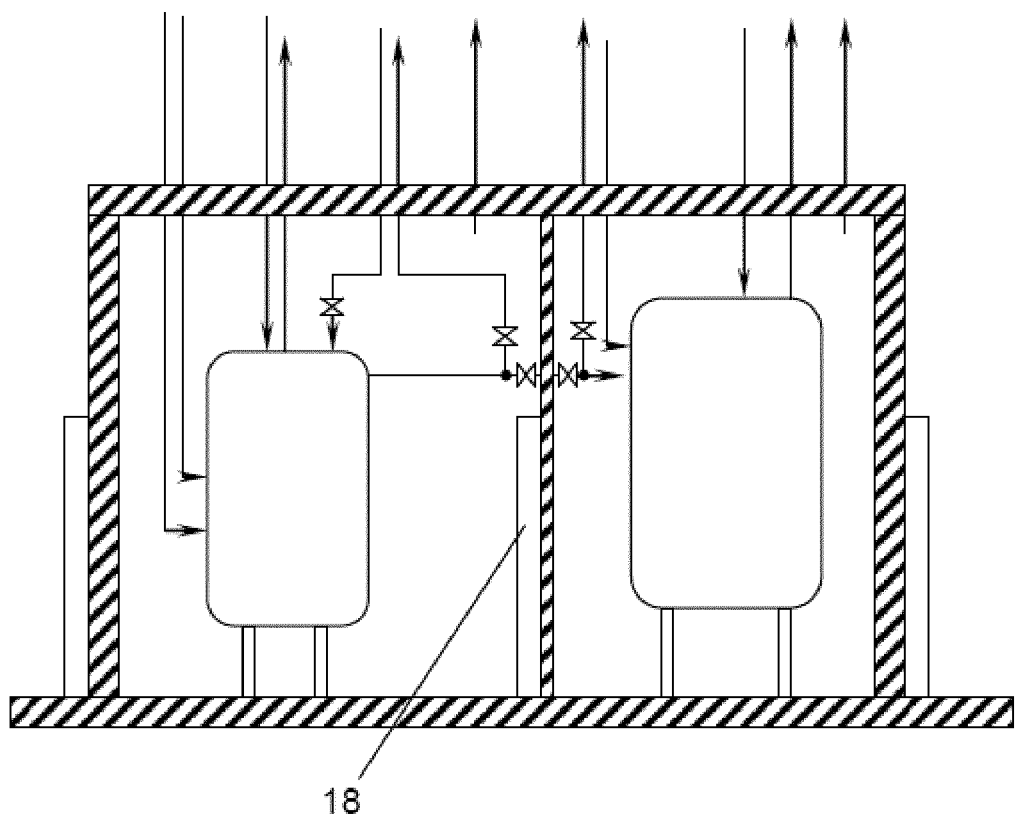
FIG. 3 a variation of the first example embodiment in a representation according to FIG. 2.

FIG. 3 shows a variation to what is shown in FIG. 2. The permanent inner wall 13 shows an opening which is closed by an inner door or panel 18 at least in the production mode. In the case that the complete unit is phosgene-free, the sub-space according to (i) P is accessible via the sub-space according to (ii) S and the sub-space according to (ii) S is accessible via the sub-space according to (i) P, when the door or panel 18 is open or removed from the inner wall 13.

Figure 4:
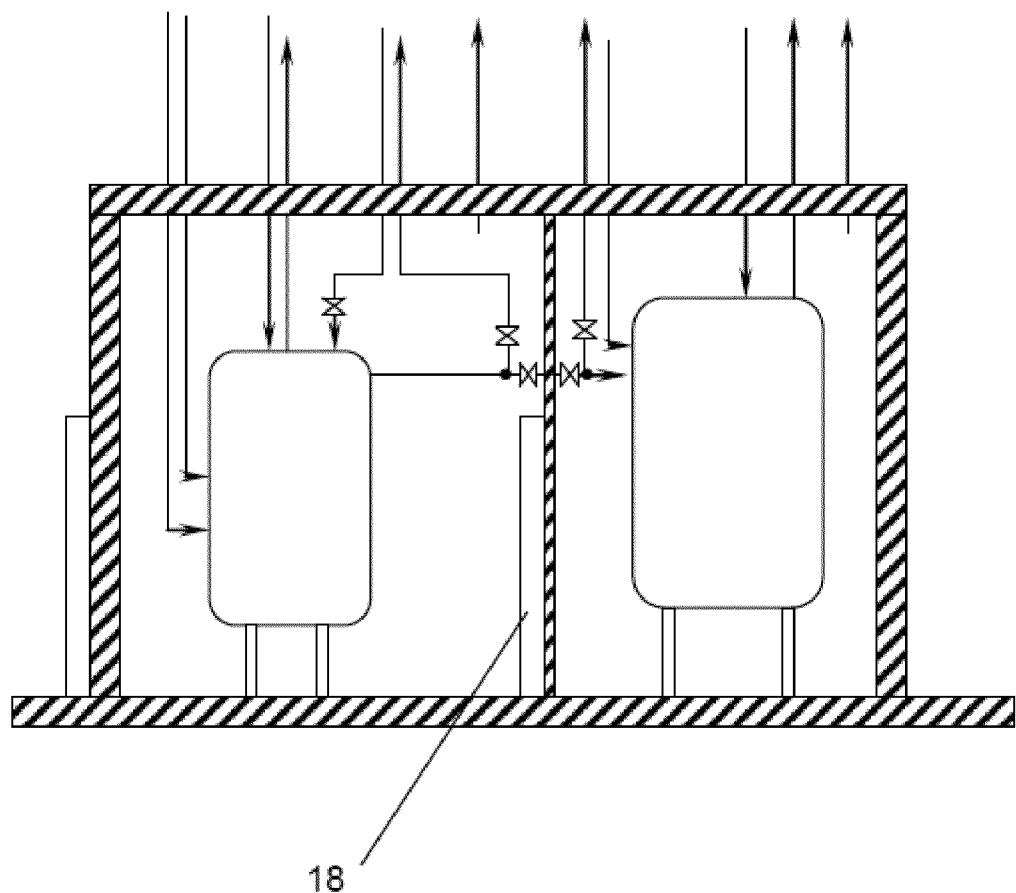
FIG. 4 a further variation of the first example embodiment in a representation according to FIG. 3.

FIG. 4 shows a variation to what is shown in FIG. 3. Here, the sub-space according to (ii) S is only accessible via the sub-space according to (i) P. This could be a useful setup if the apparatus located in the sub-space according to (i) P needs maintenance more frequently than the apparatus located in the sub-space according to (ii) S.

Figure 5:
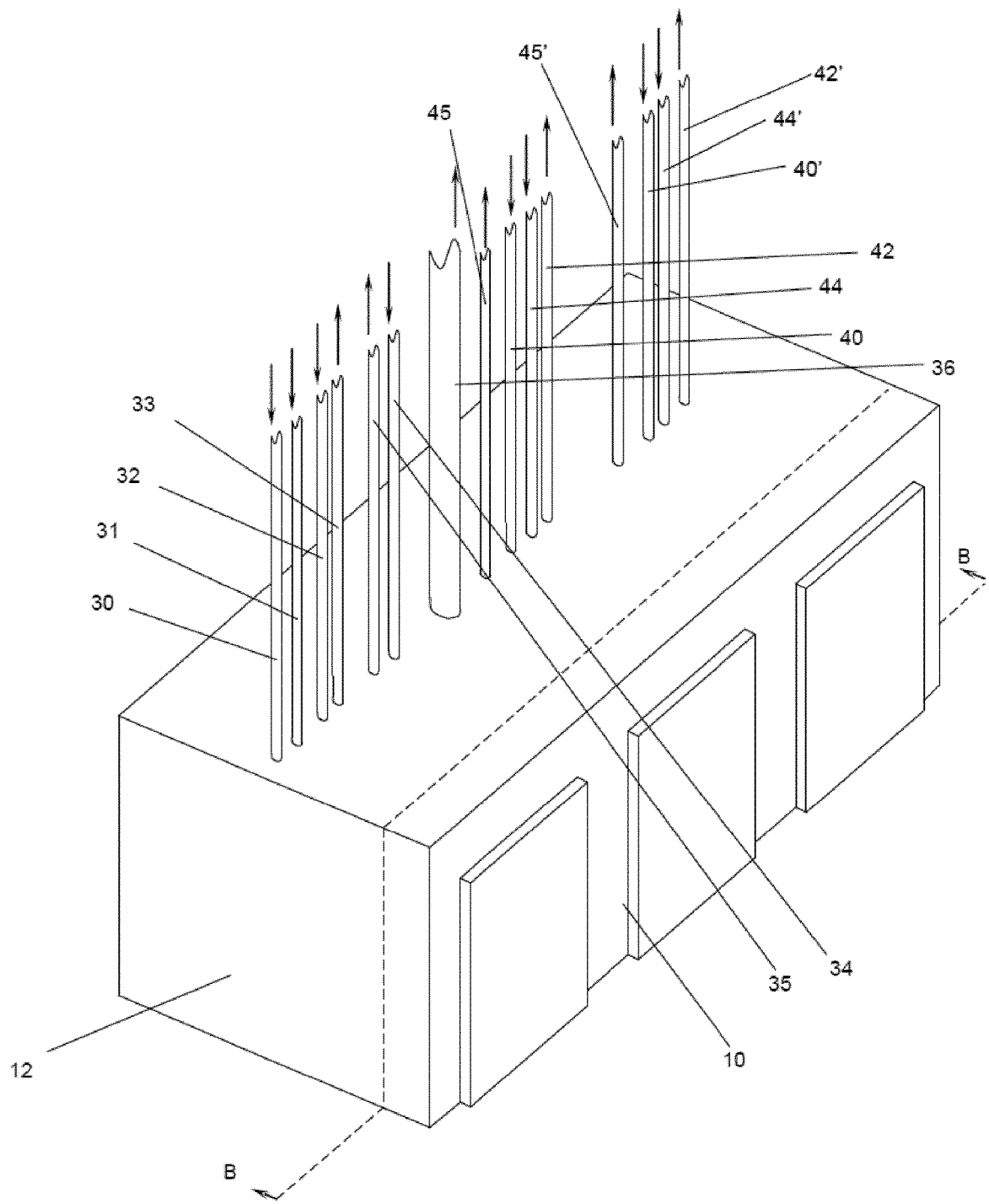
FIG. 5 a second example embodiment of the first type of the invention in a representation according to FIG. 1.
Figure 6:
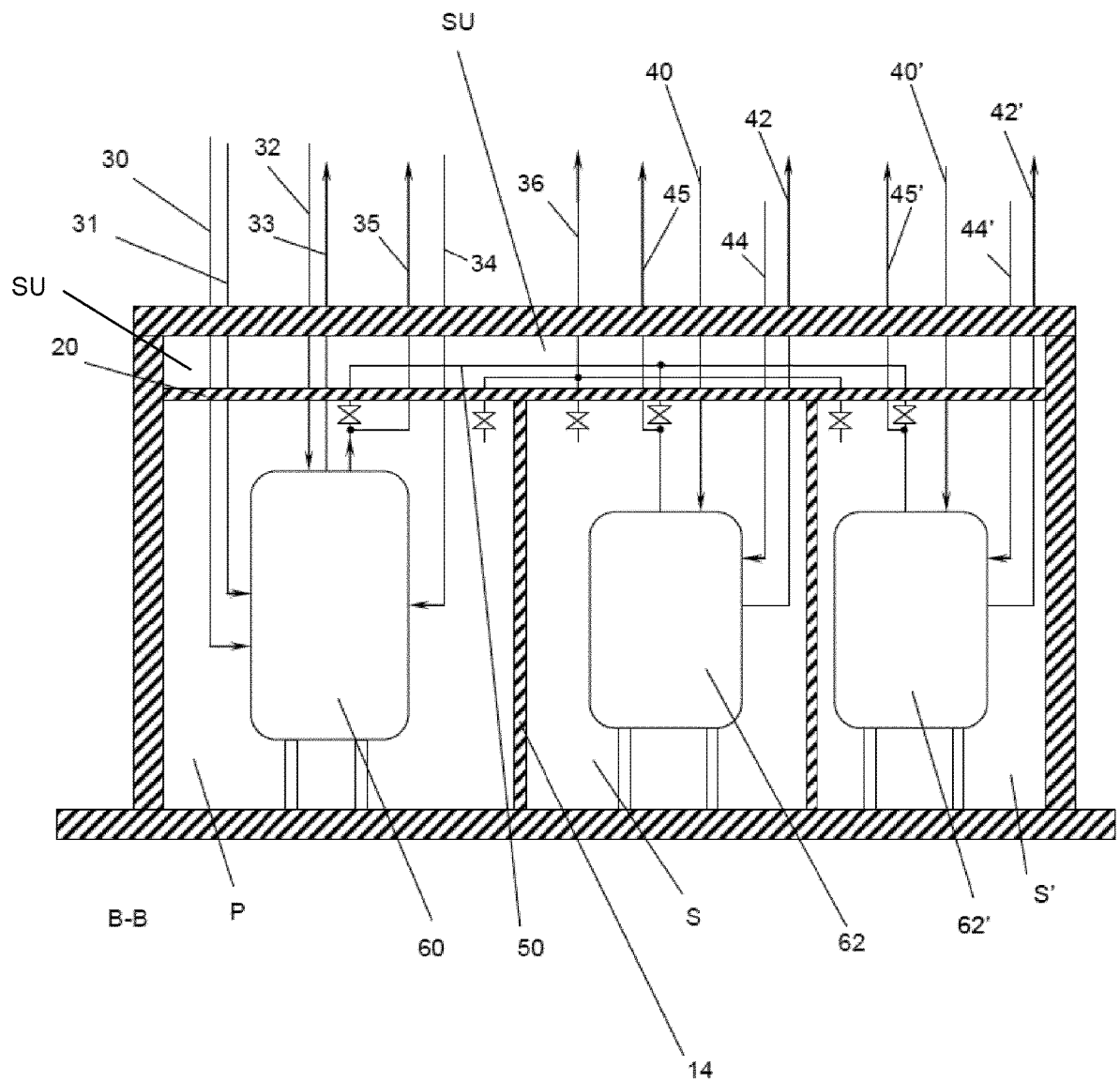
FIG. 6 the example embodiment of FIG. 5 in a sectional view taken along plane B-B in FIG. 5.

FIGS. 5 and 6 show a further variation. Here two sub-spaces according to (ii) S, S' are provided, each of them comprising an apparatus for processing phosgene 62, 62'. Since both apparatuses for processing phosgene 62, 62' are provided with phosgene by the same apparatus for producing phosgene 60 being located in the sub-space according to (i), the phosgene line 50 is in a form of a phosgene net. In this example embodiment a part of this phosgene net is located in a supply sub-chamber SU between an intermediate ceiling 20 and the top of the joint outer housing 10. This supply sub-chamber is gas-tightly sealed from the sub-spaces P, S and S'. Since all sub-spaces and the apparatuses being located in them can be made phosgene-free independently from the other sub-spaces as described above, it is for example possible to open the sub-space S' and perform maintenance work to the apparatus for processing phosgene 62', while the apparatus for producing phosgene 60 and the apparatus for processing phosgene 62 still work.

Figure 7:
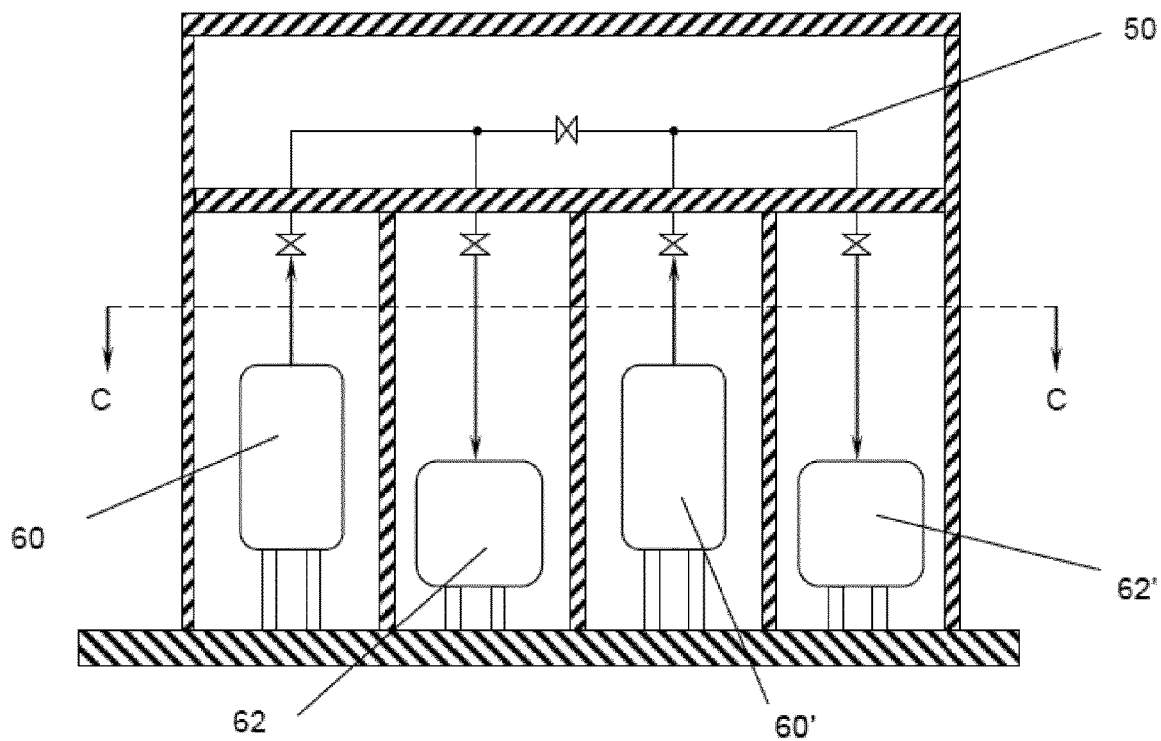
FIG. 7 a variation of the example embodiment of FIGS. 5 and 6 in a representation according to FIG. 6.

As can be seen from FIG. 7, the concept can of course be generalized to as many sub-spaces as desired. Like it is shown in FIG. 7, it is for example possible to have two sub-spaces according to (i) P, P', each containing an apparatus for producing phosgene 60, 60', and two sub-spaces according to (ii) S, S', each containing an apparatus for processing phosgene 62, 62'. Also in this case, it is preferred to have a phosgene line 50 in form of a phosgene net which connects all apparatuses for producing phosgene 60, 60' and all apparatuses for processing phosgene 62, 62'. So, an apparatus can be maintained while the other apparatuses still work.

Figure 8:
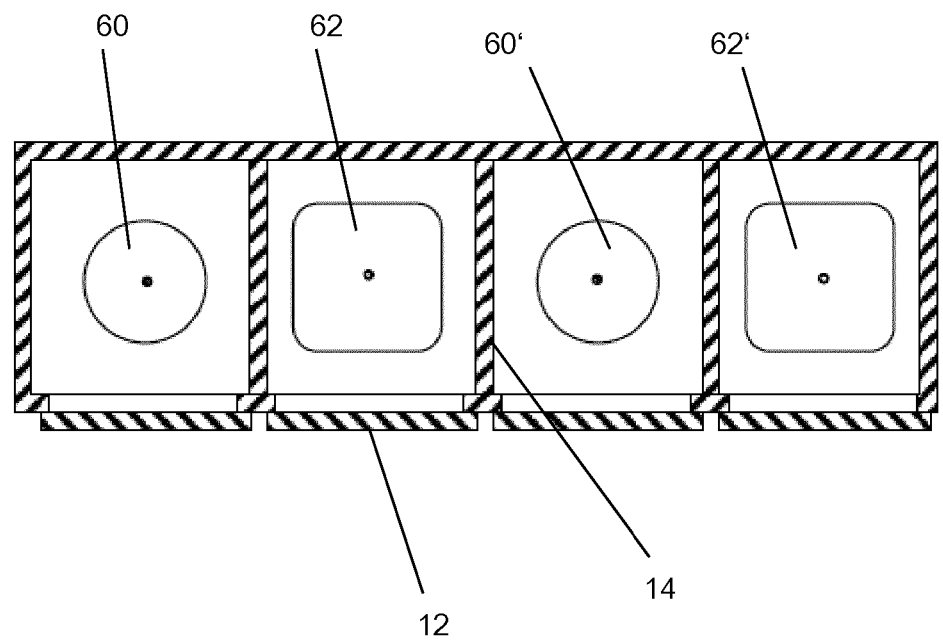
FIG. 8 the example embodiment of FIG. 7 in a sectional view taken along plane C-C in FIG. 7.

As it is shown in FIG. 8, a production line often comprises more than one apparatus for processing phosgene for example three such apparatuses 62a, 62b, 62c. Especially in this case it is possible to have more than one production line each being comprised of an apparatus for producing phosgene 60, 60' and subsequent apparatuses for processing phosgene 62a, 62b, 62c; 62a', 62b', 62c' inside the confined space. For example each apparatus can be located in a separate sub-space. Also in this case it is preferred to connect all apparatuses with a joint phosgene net, so that an apparatus can be by-passed by an identical apparatus in the parallel production line.

Figure 9:
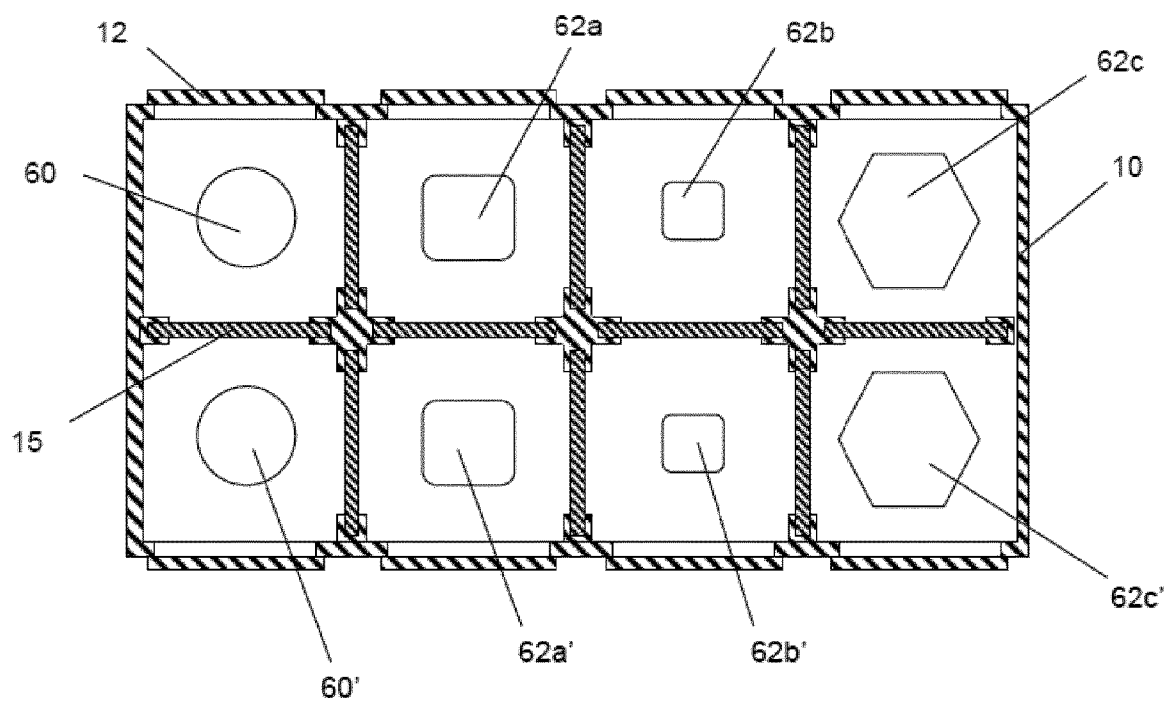
FIG. 9 a third example embodiment of the first type of the invention in a representation to FIG. 8.

FIG. 9 additionally shows another aspect of the invention. Here, the inner walls 15 are not permanent inner walls but non-permanent inner walls 15 which can be removed, such that the confined space can be configured as needed. In the example embodiment shown, a grid for the non-permanent inner walls 15 is defined by attachment means located on the inside of the joint outer housing 10 and vertically extending posts.

Figure 10:
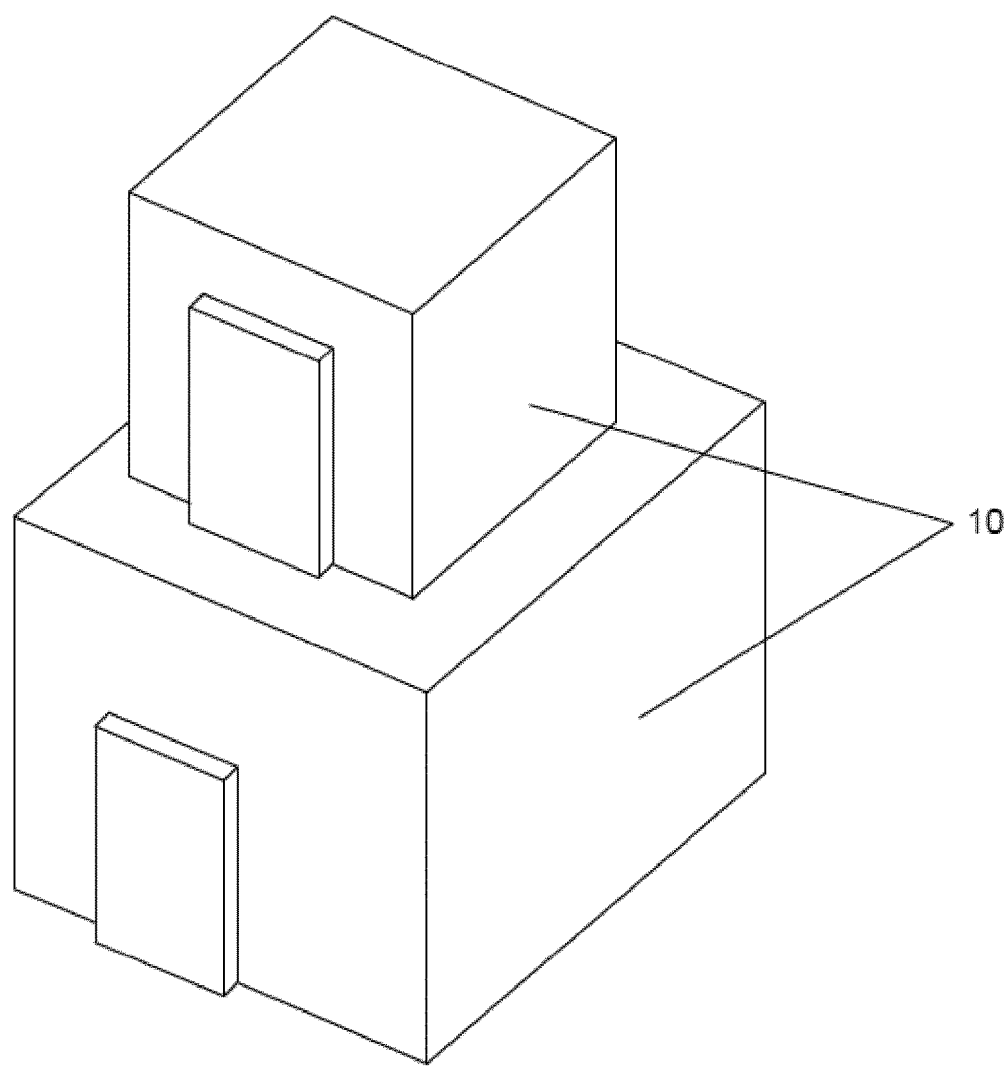
FIG. 10 a fourth example embodiment of the first type of the invention in a schematic perspective view.

FIG. 10 shows another example embodiment of an inventive unit having a joint outer housing with two sub-spaces. The difference to the example embodiment shown in FIG. 1 is that one of the sub-spaces is located on top of the other sub-space, such that the permanent inner wall separating the two sub-spaces from one another this extending horizontally.

Figure 11:
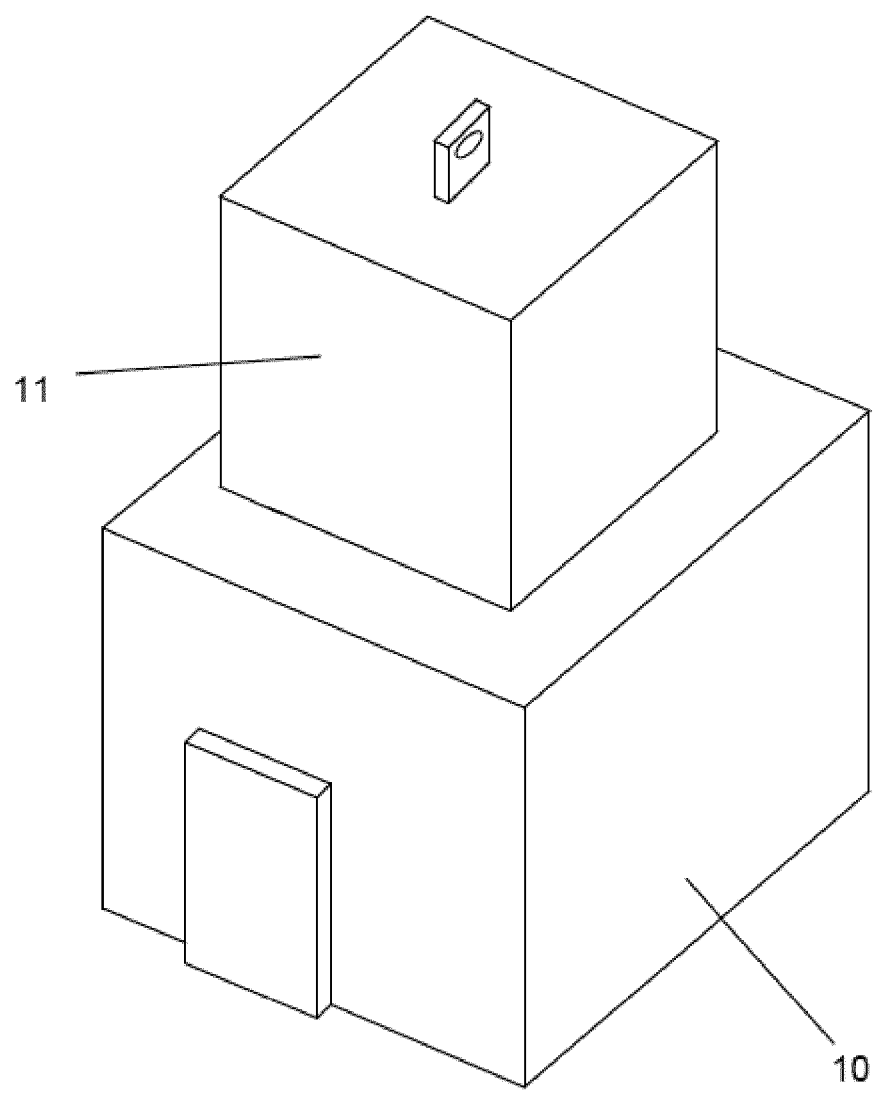
FIG. 11 a first example embodiment of a second type of the invention in a representation according to FIG. 10.

FIG. 11 shows an example embodiment of a second type of the inventive unit. The main difference to the first type described above is, that the structure comprises two housings, therein both housings enclose at least one sub-space and therein one housing 11 is movable. This means, that the openable and lockable access means is defined by this movable outer housing 11 itself. In the example embodiment of FIG. 11, this movable outer housing 11 does not have a floor and stands on the roof of a non-movable outer housing which could be in form of a joint housing 10, comprising more than one sub-space, but it is also possible that the lower outer housing contains only one sub-space.

Figure 12:
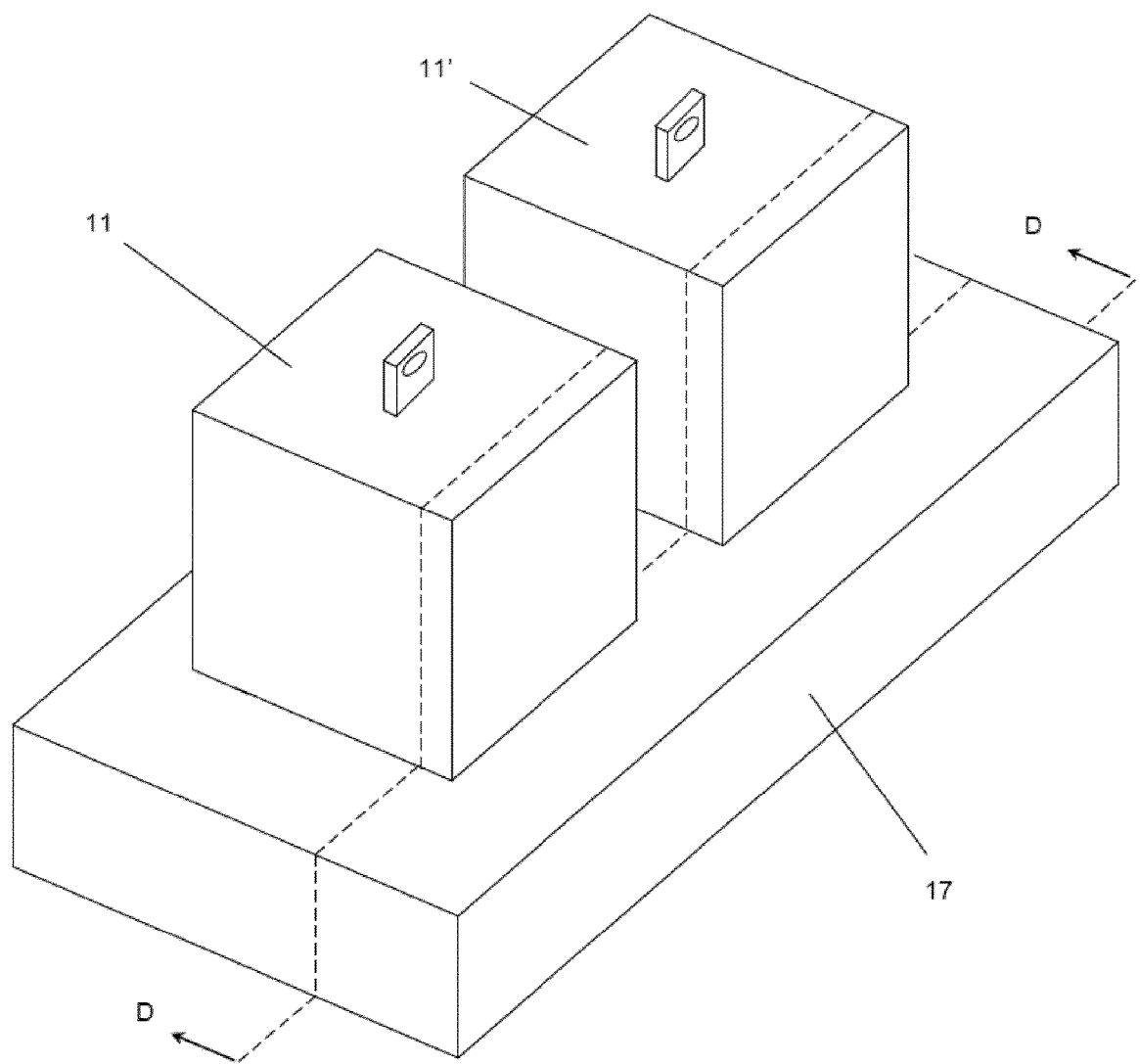
FIG. 12 a second example embodiment of the second type of the invention in a representation according to FIG. 11.
Figure 13:
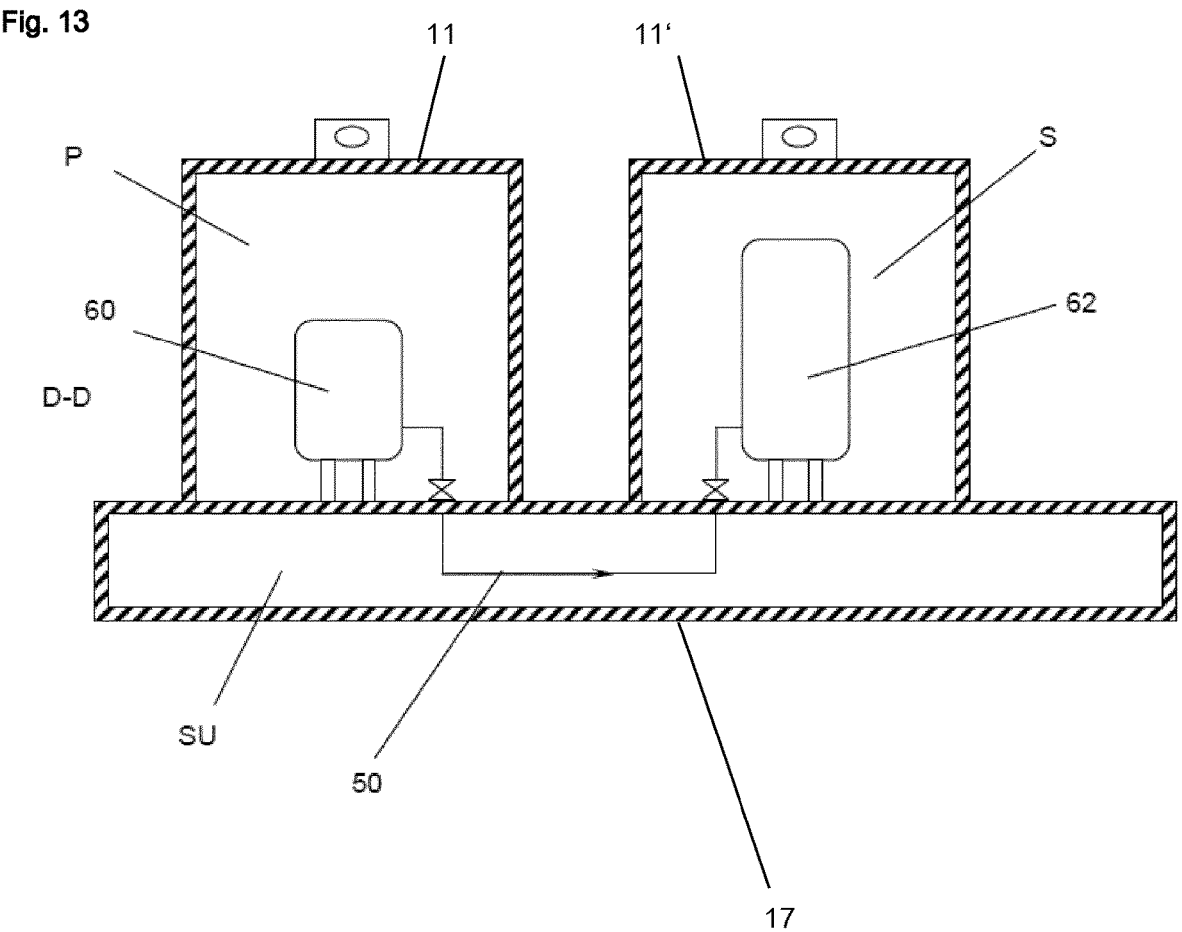
FIG. 13 a sectional view taken along plane D-D in FIG. 12.
Figure 14:
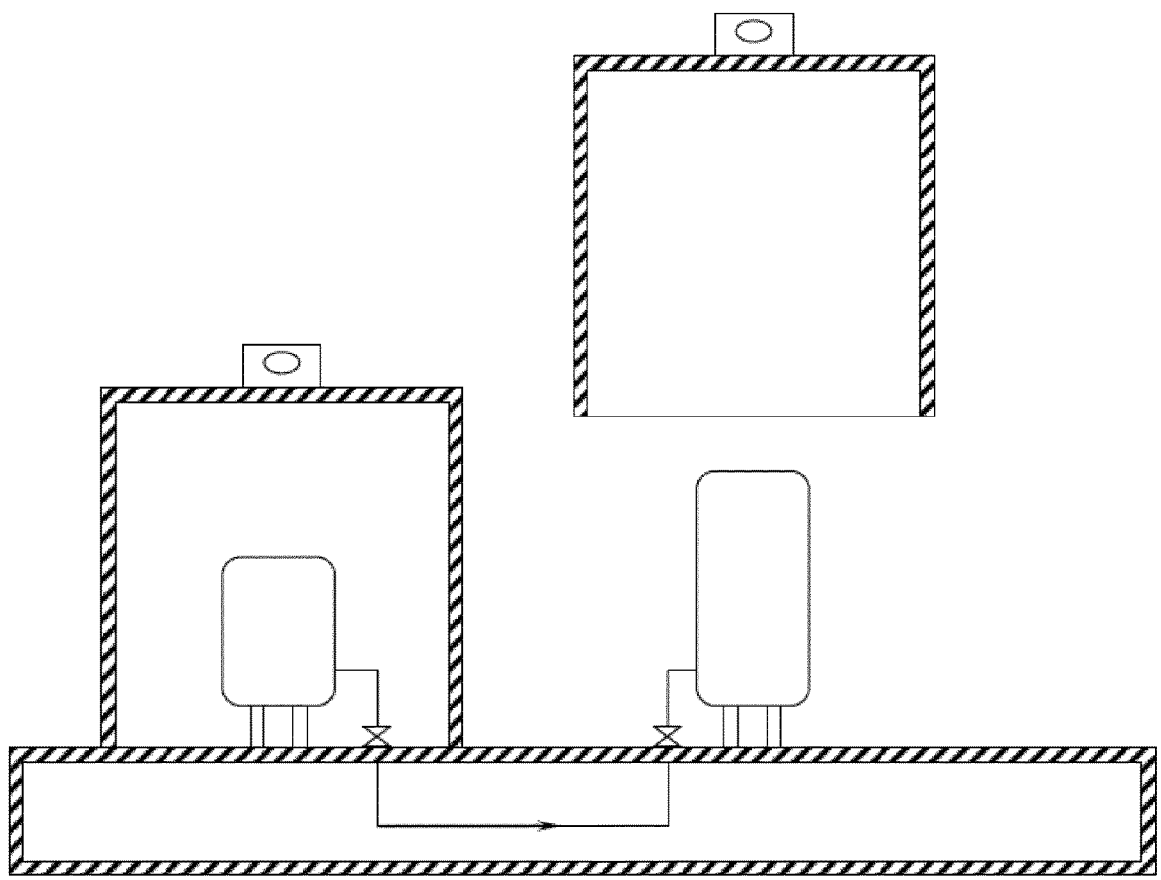
FIG. 14 what is shown in FIG. 13 in a maintenance mode.

This concept of having at least one movable housing will become more apparent in view of the example embodiment shown in FIGS. 12 to 14. Here, two movable outer housings 11, 11' are located on a joint base 17 which also houses a section of the phosgene line 50 which usually means that this base 17 houses a supply sub-space SU. According to the definition chosen here, the base 17 and both movable outer housings 11, 11' form the structure that defines the confined space. Both movable housings lack a bottom such that in the production mode sections of the base 17 form the lower boundaries of the sub-spaces P, S. The apparatus for producing phosgene 60 and the apparatus for processing phosgene 62 are placed on the base such that they are accessible as soon as the respective movable outer housing 11, 11' is removed, especially lifted. This is shown in FIG. 14 with the example of the opened sub-space according to (ii) S.

Figure 15:
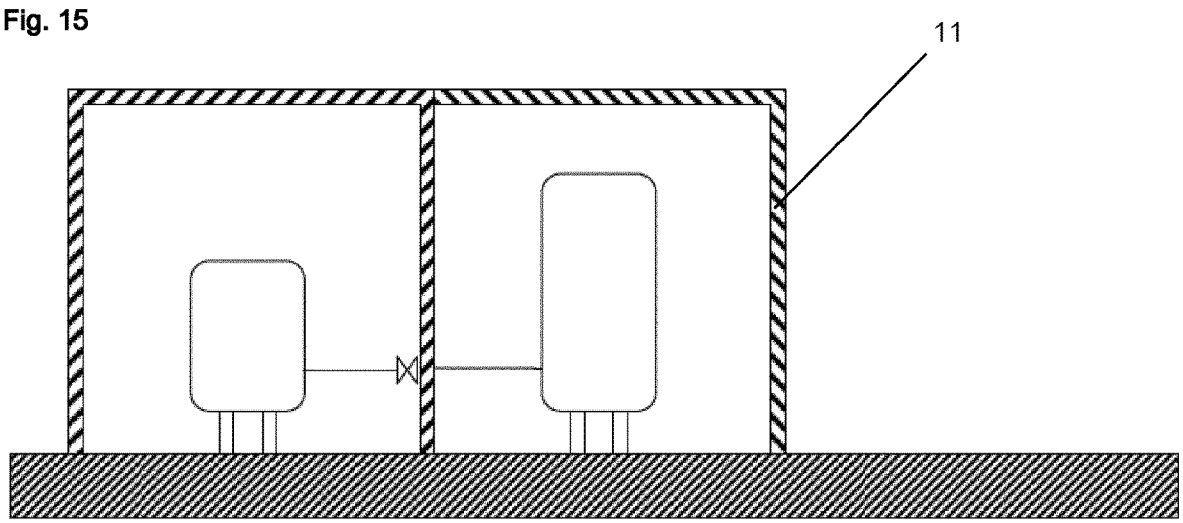
FIG. 15 a third example embodiment of the second type of the invention in a representation according to FIG. 14.
Figure 16:
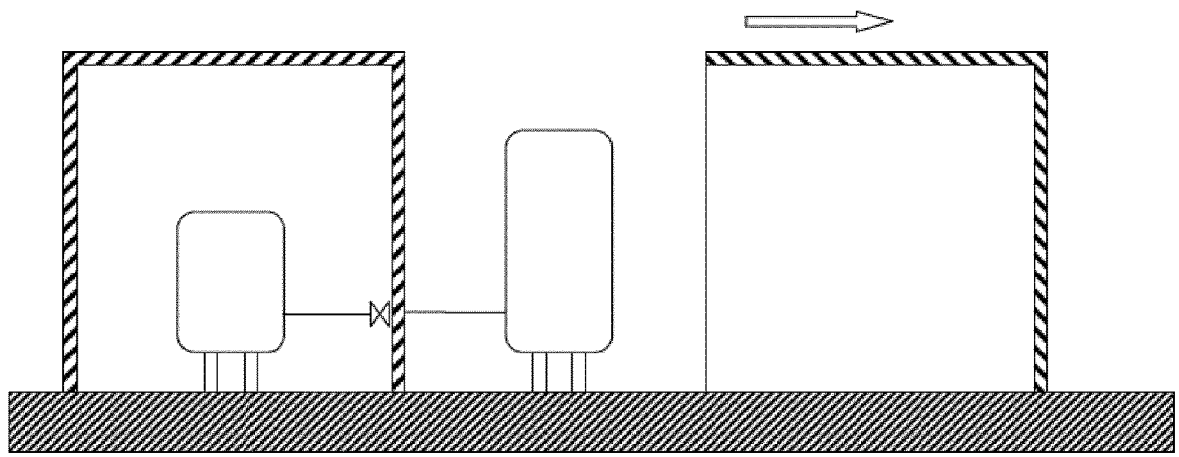
FIG. 16 what is shown in FIG. 15 in a maintenance mode.

FIGS. 15 and 16 show a second example embodiment of the second type. Here, the removable outer housing 11 is open at one side and joins the other housing (which is in this case usually not movable) laterally. In a maintenance mode, the removable outer housing 11 is moved to the side.

Of course, also in the second type of the unit according to the invention, supply lines, cooling liquid lines, flushing medium lines, exhaust lines, reagent supply line(s), and product or product mixture in solvent output line(s) are present, but not shown in the schematic Figures.

The housings, permanent inner walls, outer doors and inner doors can be made of any suitable material, for example concrete, metal (especially steel or aluminum) or plastic material, especially fiber enforced plastic material, or combinations thereof.

The non-permanent inner walls and removable panels can also be made of any suitable material, for example aluminum or plastic material, especially fiber enforced plastic material, or combinations thereof.

LIST OF REFERENCE NUMBERS IN THE FIGURES 10 joint outer housing
11, 11' removable outer housing
12 outer door/outer removable panel
14 permanent inner wall
15 non-permanent inner wall
17 base
18 inner door/inner removable panel
20 intermediate ceiling
30 carbon monoxide supply line
31 chlorine supply line
32 cooling liquid supply line
33 cooling liquid return line
34 first flushing medium supply line
35 first flushing medium return line
36 first exhaust line
40 reagent supply line
42 product or product mixture in solvent output line
44 second flushing medium supply line
45 second flushing medium return line
46 second exhaust line
50 phosgene line
60, 60' apparatus for producing phosgene
62, 62' apparatus for processing phosgene
P, P' sub-space according to (i)
S, S' sub-space according to (ii)
SU supply sub-space

The invention claimed is:

1. A unit for producing and processing phosgene, said unit being configured for at least one maintenance mode and at least one production mode and comprising a structure which defines a confined space in a production mode, said confined space being sub-divided into at least two sub-spaces, wherein
   (i) at least one sub-space contains at least one apparatus for producing phosgene;
   (ii) at least one sub-space, other than the at least one sub-space according to (i), contains at least one apparatus for processing phosgene;
   (iii) the structure comprises at least one openable and lockable access means for temporary access of at least one of the apparatuses according to (i) or (ii) from outside the structure in a maintenance mode.

2. The unit of claim 1, comprising a phosgene line connecting an apparatus for producing phosgene according to (i) and an apparatus for processing phosgene according to (ii) so that the apparatuses are in fluid communication with each other, wherein the phosgene line is located completely inside the confined space.

3. The unit of claim 1, comprising
at least two sub-spaces according to (i);
and/or
at least two sub-spaces according to (ii).

4. The unit of claim 1, wherein the structure comprises a joint outer housing in which at least one sub-space according to (i) and at least one sub-space according to (ii) are located.

5. The unit of claim 4, wherein adjacent sub-spaces are separated from each other by an inner separation means.

6. The unit of claim 5, wherein the inner separation means comprises at least one inner openable and lockable access means for temporary access of at least one sub-space from at least one other sub-space.

7. The unit of claim 5, wherein the inner separation means comprises at least one inner wall being removably connected to the joint outer housing.

8. The unit of claim 4, wherein the joint outer housing comprises
(iv) at least one openable and lockable access means for temporary access of at least one sub-space according to (i); and/or
(v) at least one openable and lockable access means for temporary access of at least one sub-space according to (ii).

9. The unit of claim 8, wherein at least one of the openable and lockable access means according to (iv) or (v) is configured as an openable and lockable transfer means for temporary removal, in a maintenance mode, of at least part of at least one apparatus for producing phosgene according to (i) or at least part of at least one apparatus for processing phosgene according to (ii) from the structure through at least one of said transfer means in opened state.

10. The unit of claim 1, wherein the structure comprises
(vi) at least one outer housing in which at least one sub-space according to (i) is located, and
(vii) at least one outer housing, other than the outer housing according to (vi), in which at least one sub-space according to (ii) is located.

11. The unit of claim 10, wherein at least one of the outer housings according to (vi) and/or at least one of the outer housings according to (vii) lacks a floor and is designed to be movable, preferably liftable.

12. The unit of claim 9, wherein at least one of the outer housings according to (vi) or at least one of the outer housings according to (vii) constitutes a joint outer housing in which at least one sub-space according to (i) and at least one sub-space according to (ii) are located.

13. The unit of claim 1, being comprised in a production plant.

14. A production plant, said production plant comprising a unit according to claim 1.

15. Use of a unit according to claim 1 in a production plant.

* * * * *